W. FOX.
Glass-Mold.

No. 218,010. Patented July 29, 1879.

Witnesses
W. H. Cushing
E. K. Howard

Inventor.
William Fox.
By Howard Bros & Co.
his Attorneys.

UNITED STATES PATENT OFFICE.

WILLIAM FOX, OF STEUBENVILLE, OHIO, ASSIGNOR OF ONE-HALF HIS RIGHT TO ROBERT J. BEATTY.

IMPROVEMENT IN GLASS-MOLDS.

Specification forming part of Letters Patent No. 218,010, dated July 29, 1879; application filed April 9, 1879.

*To all whom it may concern:*

Be it known that I, WM. FOX, of Steubenville, in the county of Jefferson and State of Ohio, have invented certain new and useful Improvements in Glass-Molds; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates specially to improvements in blow-molds; and consists of the combination, with the mold, of one or more gaging or marking tools, by which the workman is enabled to mark or score the article at the proper length for severing from the punty-iron during the operation of forming the article in the mold.

In the present state of the art this operation of marking the article at the point it is to be severed in the direction of its length is usually done by hand after the bowl has been removed from the mold with the ordinary glass tool in general use, by holding the metal blade in contact with the surface of the article while it is being rotated upon the workman's chair. The blade of the tool forms an annular groove or score around the body of the article, chilling the glass in its passage according to the pressure, which permits the uneven end to be readily knocked off by a slight blow with the tool, leaving a straight rim for finishing by grinding or otherwise. With my improvement this operation is done by the workman while the article is being formed in the mold, thus effecting considerable saving in time and labor in manufacturing the articles.

Figure 1:
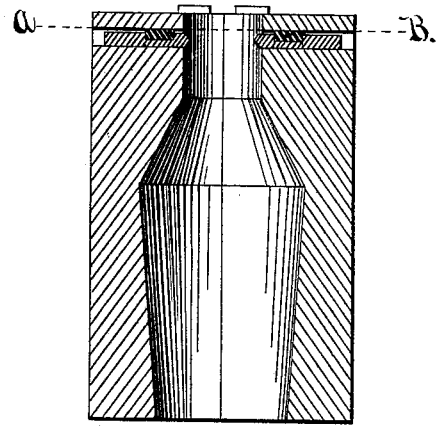
Figure 2:
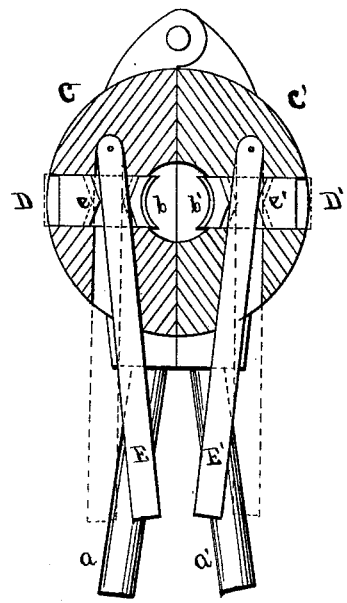

In the drawings, Figure 1 is a vertical central section of a glass-mold. Fig. 2 is a sectional view through line A B, Fig. 1.

Like letters of reference refer to like parts.

The letters C C' designate the body of the mold; *a a'*, the handles. D D' are marking-tools, made of flat pieces of steel or other suitable material, seated to slide in grooves through the body of the mold.

The tools have a curved marking-edge, *b b'*, which conforms to, and is parallel with, the circular walls on the interior of the mold, the curved edge being beveled from both sides to the center, in order that the tool may readily score the article within the mold. These tools are moved in and out by means of two hand-levers, E E', which work in slots or channels through the body of the mold at right angles to that of the tools, and are connected with the tools by being halved over them at *e e'*, the end of the levers extending past the tools and pivoted to the body of the mold.

The mode of operation is as follows: The glass-blower, having collected a sufficient quantity of molten glass upon the end of his punty to form the body of the article, places the same within the mold with the aid of an assistant, who opens and closes the molds, and then inflates the glass and forms the body of the article, at the same time rotating it rapidly back and forth in the usual manner to prevent mold-marks. During this operation the assistant, with the aid of the levers, draws the marking-blades toward the center of the mold in contact with the body of the article with sufficient pressure to crease or score a ring around it while it is being rotated within the mold.

After the article is formed it is removed from the mold and severed from the punty without further manipulation, by simply cracking it off at the line of fracture made by the marking-tools in the mold.

The marking-tools can be placed at both ends of the body-forming matrix when making tubular chimneys or like articles.

One great advantage of the marking-tools is, that the articles are made a uniform size, and are not subject to the irregularities of handwork.

I am aware that it is old to provide a sectional mold with knife-edges, over which the glass is blown, forming a crease at the point where the article is to be separated; and I am also aware that it is old to provide a revolving mold with knives made adjustable by set-screws, for the purpose of scoring the article as the mold revolves around it; and I do not claim either of such inventions.

I claim—

1. The combination, with a sectional stationary mold, wherein the article is rotated while being formed, of movable cutters adapted to be pressed gradually against the article in the mold, substantially as and for the purpose set forth.

2. In combination with the sectional glass-mold A, the movable tools D D, sliding in ways or grooves in the opposite sections of the mold, and the levers E E', pivoted on opposite sides of the mold, substantially as and for the purposes set forth.

In testimony that I claim the foregoing as my own I hereunto affix my signature in presence of two witnesses.

WM. FOX.

Witnesses:
 JAMES G. WEY,
 R. J. BEATTY.